United States Patent [19]
Hawkins

[11] 3,780,565
[45] Dec. 25, 1973

[54] FLUID VAPORIZATION TESTER
[75] Inventor: Jerry F. Hawkins, Kettering, Ohio
[73] Assignee: General Motors Corporation, Detroit, Mich.
[22] Filed: Oct. 19, 1972
[21] Appl. No.: 299,144

[52] U.S. Cl................................................ 73/17 A
[51] Int. Cl. ........................................ G01n 25/02
[58] Field of Search................................... 73/17 A

[56] References Cited
UNITED STATES PATENTS
2,900,816  8/1959  Anderson............................... 73/17
3,621,706  11/1971  Markey................................... 73/17

*Primary Examiner*—Herbert Goldstein
*Attorney*—Paul Fitzpatrick et al.

[57] ABSTRACT

A fluid vaporization indicator for brake fluid in which a chamber of specified volume is filled with test fluid and heated by two resistors arranged one above the other in the chamber and connected in a bridge circuit. When sufficient vapor has been formed so that the upper resistor is exposed to vapor, that resistor's resistance increases and the bridge circuit shows an imbalance. The temperature at this instant, as measured by a thermocouple in the fluid, approximates the vapor-lock temperature of the fluid. The chamber includes an inlet, outlet and overflow tube arrangement to insure consistent sample sizes and to facilitate emptying and flushing the chamber between tests.

1 Claim, 1 Drawing Figure

PATENTED DEC 25 1973 3,780,565
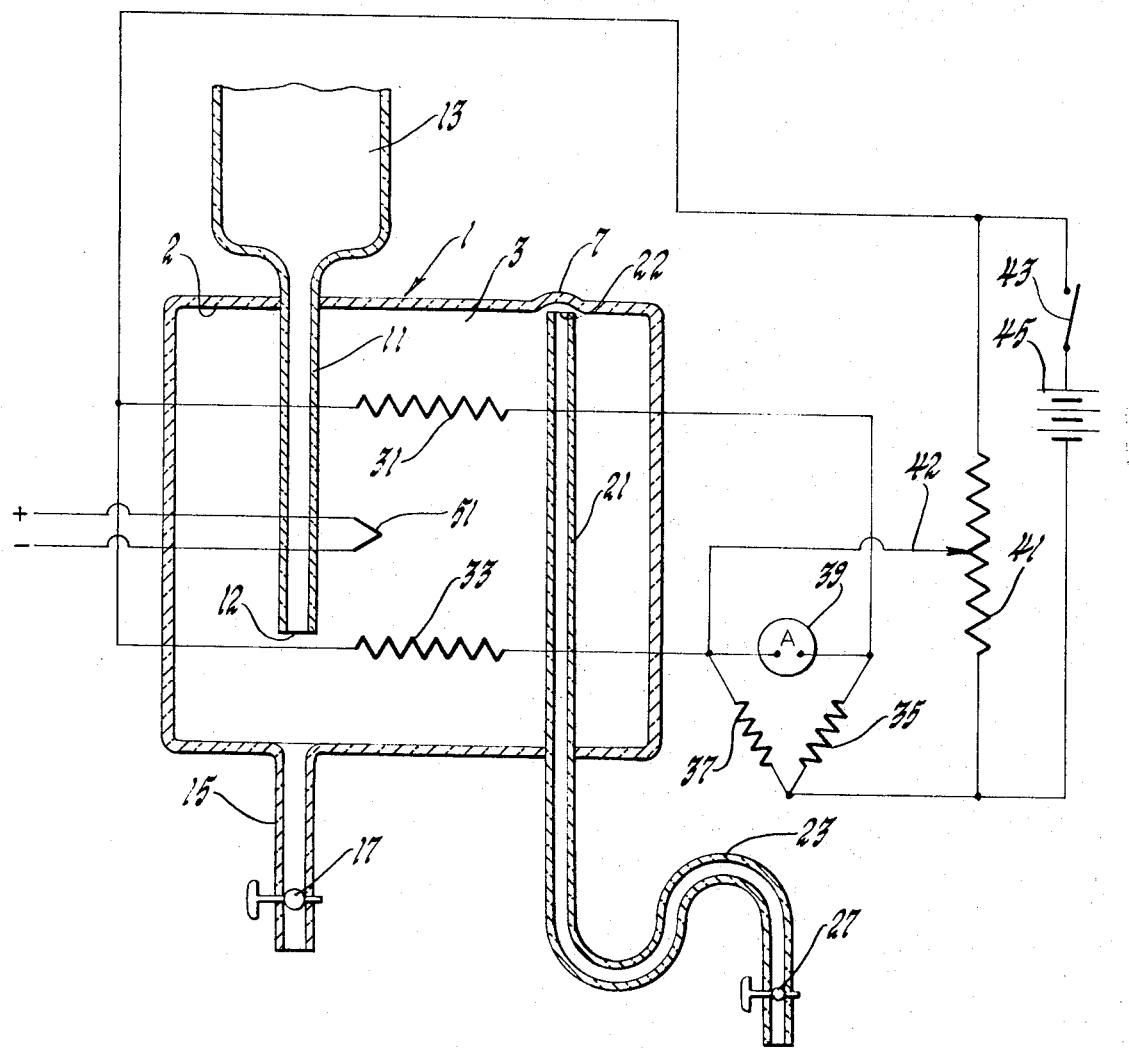

FLUID VAPORIZATION TESTER

BACKGROUND OF THE INVENTION

The phenomenon of vapor lock has long been recognized as a potentially serious problem in automotive braking systems. This problem can occur because an automotive braking system requires a noncompressible fluid to transmit pressure from the pedal operated master cylinder through conduits to the operating cylinders at the wheels. If the temperature of this fluid is increased, the liquid eventually reaches a temperature where it begins to form vapor. Since the vapor is compressible and the master cylinder displaces a very small volume, the formation of even a small amount of vapor can cause the brakes to fail. The problem is compounded by the fact that contamination by very small amounts of water can greatly reduce the vapor lock temperature of the best currently available brake fluids, and that water contamination is not uncommon in the brake systems of vehicles that have been operated for a considerable time.

Thus a test for brake fluid vapor lock temperature that is both fast and easy to perform yet yields consistently accurate results is greatly desired by researches and would be of great utility in garages for "in the field" checkups. The currently available tests require the constant attention of an operator. For instance, the equilibrium reflux boiling point test, currently used in the SAE J1703 and Federal VVB 680a brake fluid specifications measures the temperature of a boiling fluid which has reached an equilibrium condensation or reflux of a specified number of drops per second back into the fluid, as observed by the operator. Another test, the Gilpin dilatometer test, requires that the amount of vapor in the closed end of a dilatometer filled with boiling fluid be watched and the temperature noted when that vapor reaches a specified volume. Even the Markey test, described in U.S. Pat. No. 3,621,706, requires an operator to watch for a surge of percolating liquid through a glass tube. Of course, this last described test could be combined with photocell switching apparatus and a modified thermometer for automatic recording, but the resulting apparatus would be cumbersome and expensive.

SUMMARY OF THE INVENTION

My invention is an improved, inexpensive apparatus for determining the vapor lock temperature of a fluid. My apparatus yields consistent results that correspond at least as closely as those of currently used tests with the results obtained on an inertial brake cylinder dynamometer; but the normal expected time for completion of a test on my apparatus is 5 minutes or less, which makes it faster than the previous tests. In addition, my apparatus is designed to be easily adaptable for automatic recording of the vapor lock temperature and shutdown; the operator need only be present to start the test.

My apparatus comprises a specially designed flask with associated input and output tubes that can repeatedly be filled with a small but constant volume of fluid, 5 milliliters in this embodiment, to be tested and completely drained after each test. Within the flask are a thermocouple for sensing the liquid temperature and two resistors connectible outside the flask to a current source through a bridge circuit. The resistors are arranged one above the other and serve the dual function of heating the fluid to form vapor and unbalancing the bridge circuit to signal vapor lock when the liquid falls below the upper resistor.

Further details and advantages of my invention will be apparent in the following drawing and written description.

SUMMARY OF THE DRAWING

The FIGURE is a schematic drawing of a preferred embodiment of my invention.

DESCRIPTION OF THE PREFERRED EMBODIMENT

Referring to the Figure, a flask 1 has an inner surface 2 which defines a boiling chamber 3. Inlet tube 11 projects downward into the flask 1 from the outside and has a lower end 12 well within the boiling chamber 3. The upper end of the inlet tube 11 has an enlarged portion 13 to aid in introduction of test fluid through the inlet tube 11 to the boiling chamber 3 and to retain fluid raised by the pressure of vapor formed within the boiling chamber 3. The flask 1 has formed therein an outlet tube 15 at the lowest point of the boiling chamber 3; and the outlet tube 15 contains a valve 17 by means of which the test fluid can be selectively retained in or drained from the boiling chamber 3.

At the highest point in the boiling chamber 3, the flask 1 forms a small dome 7. Beginning just below the dome 7, within the boiling chamber 3, an overflow tube 21 extends downward through the flask 1 and out of the boiling chamber 3. The upper end 22 of the overflow tube 21 projects slightly into the dome 7; and its lower end is formed into a liquid trap 23. A valve 27 below the liquid trap 23 allows the overflow tube 21 to be selectively closed or open.

Positioned within the chamber 3 are two resistors 31 and 33. The resistor 31 is positioned significantly above the lower end of the inlet tube 11; and the resistor 33 can be positioned anywhere significantly below the resistor 31. Both the resistors 31 and 33 have one end connected together, to one end of a potentiometer 41, and through a switch 43 to one side of a battery 45. The other ends of resistors 31 and 33 are connected to one end each of resistors 35 and 37, respectively, and to the opposite terminals of current measuring meter 39. The other ends of resistors 35 and 37 are both connected to the other end of the potentiometer 41 and the other side of the battery 45. A variable voltage tap 42 of the potentiometer 41 is connected between resistors 33 and 37. It can be seen that the resistors 31, 33, 35 and 37 form a resistance bridge circuit which can be balanced by means of the potentiometer 41 as indicated by the absence of current through the meter 39.

Also included in the boiling chamber 3 is a thermocouple 51 positioned significantly below the resistor 31 and connectible to means outside the boiling chamber 3 for interpreting the signals therefrom.

The apparatus is ready for operation when the boiling chamber 3 is empty of any fluid, switch 43 is open, valve 27 is open and valve 17 is closed. The operator pours fluid to be tested through the funnel 13 into the inlet tube 11; and the boiling chamber 3 begins to fill. The boiling chamber 3 fills up completely with fluid which enters the dome 7 and begins to flow down the overflow tube 21. When the operator sees fluid emerging from the overflow tube 21, he ceases adding fluid and waits while the fluid in the inlet tube 11 quickly falls to its equilibrium level. At this point the boiling chamber is completely filled with fluid except for a small space in the dome 7 and some portion of the upper end of the overflow tube 21. The sizes of the flask 1 and tubes 15 and 21 have been computed so that the amount of fluid within the boiling chamber 3 subject to the heating of resistors 31 and 33 is as close as possible to the desired 5 milliliters.

At this point the operator closes the switch 43 and adjusts the variable voltage tap 42 on potentiometer 41, if necessary, so that no current flow is indicated on the meter 39. Immediately after this adjustment the operator closes the valve 27. Upon the closure of the switch, current is supplied through the resistors 31 and 33. These resistors are of the low resistance high wattage variety and are capable of heating the test fluid to the point where vapor begins to form. As vapor forms, it collects at the top of the boiling chamber, and causes the liquid surface to fall. The closed valve 27 prevents any liquid or vapor from escaping from the overflow tube 21; and the inlet tube 11 extends far enough down into the boiling chamber 3 so that its lower end remains well below the fluid surface level and therefor allows no significant amount of vapor to escape. In addition, the inlet tube 11 extends high enough above the boiling chamber 3 to retain the portion of the fluid that rises within it due to the increased pressures within the boiling chamber 3. As resistors 31 and 33 heat, their resistances increase. However, they are matched in thermal resistance variation; and the resistances increase at approximately the same rate, so the ammeter 39 continues to show negligible current. When the liquid surface level falls low enough to expose resistor 31 to the vapor, vapor being a poorer heat conductor than liquid, resistor 31 begins to increase in temperature relative to resistor 33; and the accompanying increase in resistance of resistor 31 relative to that of resistor 33 causes a significant current flow through the meter 39. The temperature, as indicated by the thermocouple 51, at which a certain significant current level is reached, is noted as the vapor lock temperature for that particular fluid sample. When the vapor lock temperature is obtained, the switch 43 is opened to stop current flow, and valves 17 and 27 are opened to drain the boiling chamber 3 and the overflow tube 21 respectively. Some of the fluid will remain in the fluid trap 23; however, it will be flushed out by the overflow of the next sample and will not affect further tests. One or two flushings of the apparatus with the fluid to be tested in order to remove any traces of previous test fluids are found to be helpful in obtaining the most consistent results.

Although, for simplicity, the preferred embodiment has been described as requiring the operator to watch for a current in the meter 39 and record the temperature at that moment, that current could be used as a signal to a number of devices well known in the art to accomplish the tasks automatically. For example, the switch 43 could comprise a mechanically actuable self latching relay openable by a solenoid device connected in place of the meter 39; and the temperature could be recorded by any of the commercially available machines which are capable of recording the instantaneous value of a varying parameter upon the receipt of a signal. The test is thus readily adaptable to automatic operation.

Since the temperature of the fluid continually increases while the resistors 31 and 33 are conducting, even after vapor is being formed, the measured temperature at which a given current level is reached in the meter 39 will vary according to the amount of time required for the liquid surface level to fall to the level of resistor 31, which depends on the placement of resistor 31. For this reason the device would have to be calibrated after manufacture or assembly with a standard fluid. This would be done by heating the standard fluid to the known vapor lock temperature of that fluid and, after checking that the current in ammeter 39 has started to increase significantly just before this temperature is reached, noting the current indicated at the vapor lock temperature. This current would be the switching point for the calibrated device. If the current did not rise significantly above zero as the vapor lock temperature of the standard fluid was reached, the resistor 31 could be raised in the flask 1 and the calibration repeated.

I claim:

1. Apparatus for use with a source of electric current and a resistance bridge circuit to determine the vaporization temperature of a fluid, the apparatus comprising, in combination:
    a flask defining a boiling chamber, the flask having a valved outlet at the lowest point of the boiling chamber;
    an inlet tube for the flask having a lower end within the chamber and extending upward out of the chamber;
    an overflow tube in the chamber having an upper end positioned just below the highest point of the boiling chamber and extending downward out of the chamber, the overflow tube containing a fluid trap and a valve;
    a pair of resistors within the boiling chamber, one of which is positioned higher than the lower end of the inlet tube and the other of which is positioned below the one, the resistors having substantially identical thermal resistance variation characteristics and being connectible to the source of electric current as part of the bridge circuit to heat the fluid and indicate by an imbalance of the bridge circuit the presence of vapor around the one resistor;
    and temperature measuring means positioned in the boiling chamber lower than the one resistor.

* * * * *